(12) United States Patent
Amrod et al.

(10) Patent No.: US 7,162,377 B2
(45) Date of Patent: Jan. 9, 2007

(54) TESTING AND EMULATING A DEVICE'S POWER CHARACTERISTICS

(75) Inventors: Alan Amrod, Simi Valley, CA (US); Teodoro Fornoles, Jr., Moorpark, CA (US); Douglas Schafer, Agoura Hills, CA (US)

(73) Assignee: Ixia, Calabasas, CA (US)

( * ) Notice: Subject to any disclaimer, the term of this patent is extended or adjusted under 35 U.S.C. 154(b) by 77 days.

(21) Appl. No.: 10/745,043

(22) Filed: Dec. 22, 2003

(65) Prior Publication Data
US 2005/0135258 A1 Jun. 23, 2005

(51) Int. Cl.
*G01R 21/00* (2006.01)

(52) U.S. Cl. ...................................................... 702/60

(58) Field of Classification Search .................. 702/61, 702/62, 64, 65, 60; 706/12, 16, 20, 25; 703/13, 703/18, 19, 23
See application file for complete search history.

(56) References Cited

U.S. PATENT DOCUMENTS

| | | | | |
|---|---|---|---|---|
| 5,692,160 A | * | 11/1997 | Sarin ........................... | 703/23 |
| 5,781,434 A | * | 7/1998 | Tobita et al. ................. | 700/79 |
| 5,838,947 A | * | 11/1998 | Sarin ........................... | 703/14 |
| 6,535,983 B1 | * | 3/2003 | McCormack et al. ....... | 713/310 |
| 6,618,772 B1 | * | 9/2003 | Kao et al. ..................... | 710/15 |
| 2003/0037269 A1 | * | 2/2003 | Baker et al. ................. | 713/320 |
| 2004/0230846 A1 | * | 11/2004 | Mancey et al. ............. | 713/300 |
| 2005/0102544 A1 | * | 5/2005 | Brewer et al. .............. | 713/320 |

OTHER PUBLICATIONS

IEEE802.3af Power Over Ethernet: A Radical New Technology, www.PowerOverEthernet.com, Apr. 11, 2003.

* cited by examiner

*Primary Examiner*—Michael Nghiem
*Assistant Examiner*—Demetrius Pretlow
(74) *Attorney, Agent, or Firm*—SoCal IP Law Group LLP; Steven C. Sereboff

(57) ABSTRACT

There is disclosed methods and apparatus for testing and emulating a device's power characteristics. Power is supplied to a device and the device's power draw characteristics may be recorded as a script. Scripts may be stored in a library. The scripts may be replayed to draw power and emulate a device.

14 Claims, 3 Drawing Sheets

US 7,162,377 B2

TESTING AND EMULATING A DEVICE'S POWER CHARACTERISTICS

RELATED APPLICATION INFORMATION

This application is related to U.S. patent application Ser. No. 10/651,427 filed Aug. 29, 2003 and entitled "Automated Characterization Of Network Traffic," which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The present invention relates to powering of devices and communicating with devices through the same media.

2. Description of Related Art

Networks such as the Internet provide a variety of data communicated using a variety of network devices including servers, routers, hubs, switches, and other devices. Before placing a network into use, the network, including the network devices included therein, may be tested to ensure successful operation. Network devices may be tested, for example, to ensure that they function as intended, comply with supported protocols, and can withstand anticipated traffic demands.

To assist with the construction, installation and maintenance of networks and network devices, networks may be augmented with network analyzing devices, network conformance systems, network monitoring devices, and network traffic generators, all which are referred to herein as network testing systems. The network testing systems may allow for the sending, capturing and/or analyzing of network communications.

Power over Ethernet (PoE) technology allows IP telephones, wireless LAN access points, digital security cameras and other devices to receive power as well as data over existing LAN cabling, without needing to modify the existing Ethernet infrastructure. PoE is governed by the international standard, IEEE 802.3af, as an extension to the existing Ethernet standards.

The PoE standard dictates the power behavior of PoE devices ("Powered Devices," or PDs) and the power supplies to which they are connected ("Power Sourcing Equipment," or PSE). However, these dictates are not comprehensive.

One aspect of PoE is a requirement to prevent damage to existing Ethernet equipment. A "discovery process," run from the PSE, examines the Ethernet cables, looking for PDs. It does this by applying a small current-limited voltage to the cable and checks for the presence of a 25 k ohm resistor in the remote device. Only if the resistor is present is the full voltage applied, but this is still current-limited to prevent damage to cables and equipment in fault conditions.

The PD must continue to draw a minimum current. If it does not (for example, when the device is unplugged) then the PSE removes the power and the discovery process begins again.

As an optional extension to the discovery process, a PD may indicate to the PSE its maximum power requirements.

The PSE may optionally provide a level of system management, using, for example, the Common Management Interface Protocol (CMIP) or the Simple Network Management Protocol (SNMP). This allows, for example, PDs to be powered off at night, or remotely reset.

DETAILED DESCRIPTION OF THE INVENTION

Throughout this description, the embodiments and examples shown should be considered as exemplars, rather than limitations on the apparatus and methods of the present invention.

Description of the System

Figure 1:
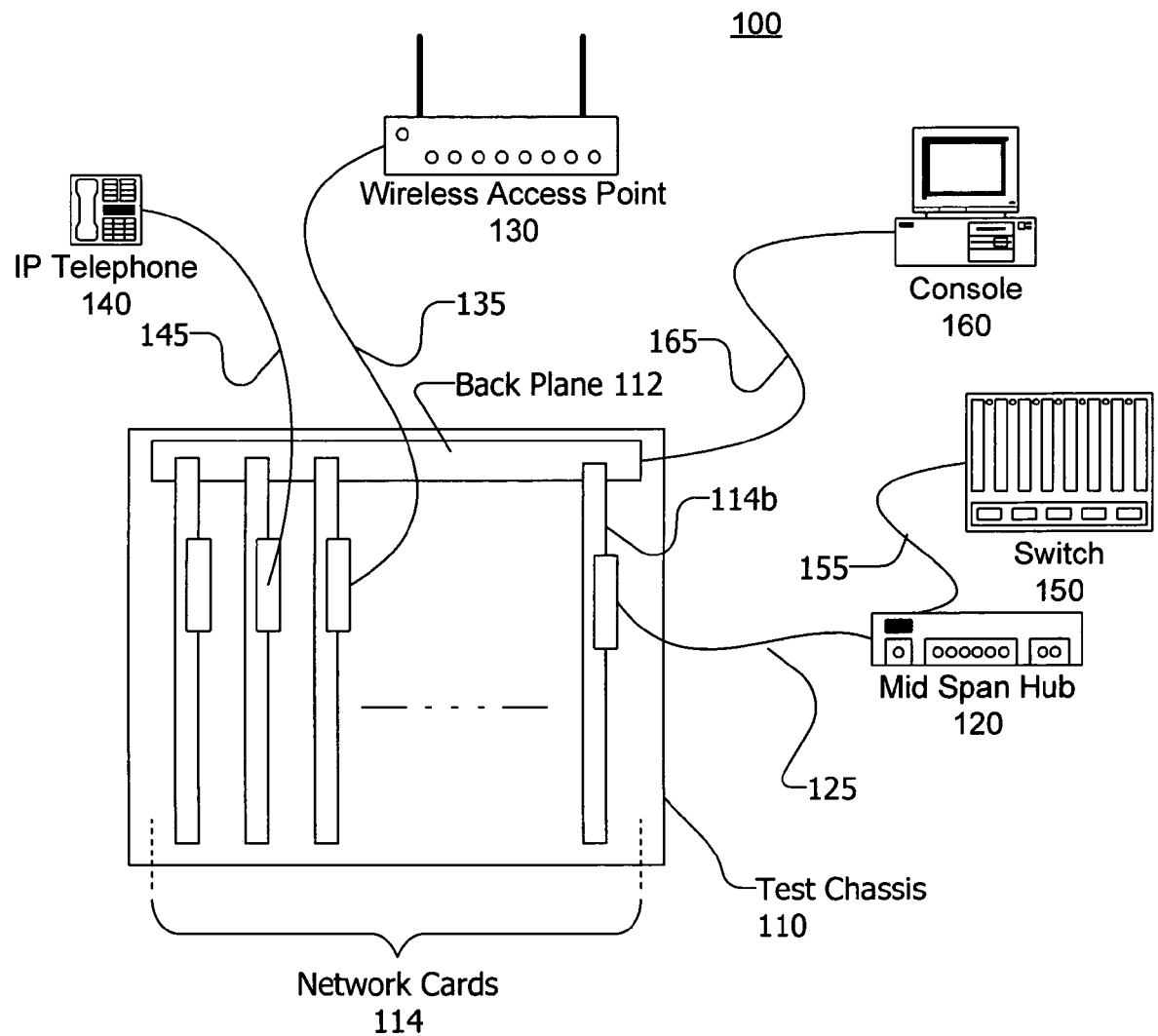
FIG. 1 is a block diagram of a powered-network environment.

Referring now to FIG. 1, there is shown a block diagram of a powered-network environment 100. The environment 100 includes a test chassis 110, a switch 150, a console 160, a mid-span hub 120, a wireless access point 130 and an IP telephone 140. A network capable device is any device that may communicate over a communications network and examples include the wireless access point 130, the IP telephone 140, and the switch 150.

A number of communications cables 125, 135, 145, 155 connect the network devices 110, 120, 130, 140, 150. As used herein, communications cables may include electrical wires, fiber optic strands and other media. The communications cables may include a number of wires, which may be paired or unpaired. The communications cables may include a single ground wire. The communications cables 125, 135, 145, 155 may be category 5 or 6, unshielded twisted pair (e.g. telephone wires), household electric wire or other cables which can carry both messages and power. One or more of the communications cables 125, 135, 145, 155 may include fiber optic strands; power may be transmitted through the fiber optic strands as, for example, light energy.

The wireless access point 130 and the IP telephone 140 are network-powered devices. A network-powered device is capable of drawing power and transmitting and receiving messages on the same communications medium. These devices may conform to the PoE standard.

The mid-span hub 120 is a power sourcing equipment. Devices and systems which can provide power on the same communications medium through which communications take place will be referred to as power sourcing equipment. Power sourcing equipment include a power supply for network-powered devices, and may conform to the PoE standard. The mid-span hub 120 can provide power to the test chassis 110 via the communications cable 125. The mid-span hub 120 may introduce power to the communications cable 125 without interfering with communications on the communications cable 125 and therefore may act as a pass-through device for communications between the switch 150 and the test chassis 110. Alternatively, the mid-span hub 120 may also act as a hub, router, switch or other network capable device. The mid-span hub 120 may have a number of ports. The mid-span hub 120 may provide power to one or more of the ports.

In addition to carrying power through communications cables, power may be transmitted wirelessly. In the wireless case, a particular band or spread spectrum may be utilized for carrying power from a power sourcing equipment to a network-powered device. This paradigm is used in some RFID (radio frequency identification) technologies.

According to one aspect of the invention, power is delivered through a communications cable on the same wires (or other media) through which messages are carried. According to a second aspect of the invention, power is delivered through a communications cable on different wires (or other media) from those through which messages are carried. According to another aspect of the invention, the carriers of power and messages varies with time.

The switch 150 is a communications switch. Other communications devices may be connected to the mid-span hub 120. The switch 150 and these other devices may receive power from the mid-span hub 120 and may also pass communications through the mid-span hub 120.

The test chassis 110 may include or be one or more of a traffic generator, a performance analyzer, a conformance validation system, a network analyzer, a network management system, and/or others. The test chassis 110 may include one or more line cards 114 and a back plane 112. The test chassis 110 may be in the form of a card rack, may be an integrated unit, or may comprise a number of separate cooperative units. The test chassis 110 may each be augmented by or replaced by one or more computing devices having line cards included therein, including, but not limited to, personal computers and computer workstations. The test chassis 110 may include an operating system such as, for example, versions of Linux, Unix and Microsoft Windows.

The test chassis 110 and the line cards 114 may support one or more higher level communications standards or protocols such as, for example, the User Datagram Protocol (UDP), Transmission Control Protocol (TCP), Internet Protocol (IP), Internet Group Management Protocol (IGMP), Internet Control Message Protocol (ICMP), Session Initiation Protocol (SIP), H.323, Hypertext Transfer Protocol (HTTP), address resolution protocol (ARP), reverse address resolution protocol (RARP), file transfer protocol (FTP), Simple Mail Transfer Protocol (SMTP); and may support one or more lower level communications standards or protocols such as, for example, the 10 Gigabit Ethernet standard, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), and proprietary and other protocols.

The term line card encompasses test cards, analysis cards, network line cards, load modules, interface cards, network interface cards, data interface cards, packet engine cards, service cards, smart cards, switch cards, relay access cards, CPU cards, port cards, and others. The line cards may be referred to as blades. The line cards 114 may include one or more computer processors, field programmable gate arrays (FPGA), application specific integrated circuits (ASIC), programmable logic devices (PLD), programmable logic arrays (PLA), processors and other kinds of devices. The line cards 114 may include memory such as, for example, random access memory (RAM). The line cards 114 may include a network interface, and the network interface may include a connector for connection with an electrical and/or optical communications cable and/or an antenna. In addition, the line cards 114 may include software and/or firmware.

The line cards 114 may be connected to the mid-span hub 120, the wireless access point 130 and the IP telephone 140 by respective communication cables 125, 135, 145. The line cards 114 may include a circuit, chip or chip set that allows for communication over the communication cables 125, 135, 145 (or a network) as one or more network capable devices.

At least one line card 114 may include a power consumption circuit coupled to the network interface. The power consumption circuit consumes power received through the network interface. Where the network interface has several lines or several pairs of lines, the power consumption circuit may be able to select which lines or pairs of lines through which the power consumption circuit will draw power. The behavior of the power consumption circuit may be variable and controllable. The power consumption circuit may dissipate power by powering in full or in part the line card 114, other line cards, the test chassis 110 and/or other devices.

At least one line card 114 may include a power supply circuit coupled to the network interface. The power supply circuit supplies power through the network interface. Such a line card 114 may act like a mid-span power hub which injects power into a network connection between two network capable devices. Alternatively, the line card 114 may itself be a communications hub or switch which also can provide power on the same lines with which it handles communications traffic. Where the network interface has several lines or several pairs of lines, the power supply circuit may be able to provide power on selected lines or pairs of lines, or on all of the lines or pairs of lines. The behavior of the power supply circuit may be variable and controllable.

With the power consumption circuit, the line card 114 can behave as a network-powered device. With the power supply circuit, the line card 114 can behave as power sourcing equipment such as a PoE PSE. The power consumption circuit and the supply circuit may be alone on a line card or combined with other features.

The power consumption circuit and the power supply circuit may be respectively capable of consuming and providing power across ranges of characteristics. The power consumption circuit and the power supply circuit may be on the same line card, and may be integrated with each other and/or the data sourcing and sinking capabilities. These ranges may include those specified in the PoE standard, and also values extending outside of the ranges specified by the PoE standard. The power consumption circuit may be able to provide and the power supply circuit may be able to deliver power to a resistive load of for example: between 19 K$\Omega$ and 26.5 K$\Omega$, between 12 K$\Omega$ and 35 K$\Omega$, and open line. The power consumption circuit may be able to provide and the power supply circuit may be able to deliver power to a load of 18 W continuous power and between 10 mA and 600 mA. The power consumption circuit may be able to provide and the power supply circuit may be able to deliver power to a short circuit of great than 1 A. The power consumption circuit may be able to provide and the power supply circuit may be able to deliver power to a constant current load of 14.5V to 20.5V and conforming to 0 mA-4 mA, 9 mA-12 mA, 17 mA-20 mA, 26 mA-30 mA and 36 mA-44 mA and slightly beyond. The power consumption circuit may be able to provide and the power supply circuit may be able to deliver power to capacitive loads of 150 nF or below, capacitive loads of 20 nF to 500 nF and capacitive loads of greater than 10 µF. The power consumption circuit may be able to provide and the power supply circuit may be able to deliver power to provide valid capacitive response to signaling up to 20 KHz.

Each line card 114 may support a single communications protocol, may support a number of related communications protocols, or may support a number of unrelated communications protocols. The line cards 114 may be permanently installed in the test chassis 110, may be removable, or may be a combination thereof. One or more of the line cards 114 may have a resident operating system included thereon, such as, for example, a version of the Linux operating system.

The back plane 112 may serve as a bus or communications medium for the line cards 114. The back plane 112 may also provide power to the line cards 114.

The console 160 may be connected to the test chassis 110 to provide application layer control of the test chassis 110. The console 160 may be a PC, workstation or other device. The console 160 may provide a high level user interface such as a GUI.

The test chassis 110 and the console 160, as well as one or more of the network cards 114, may include software (e.g., FPGA-ware, loadable programmable logic configuration) that executes to achieve the techniques described herein. As used herein, the term software involves any instructions that may be executed on a computer processor of any kind. The software may be implemented in any computer language, and may be executed as object code, may be assembly or machine code, a combination of these, and others. The term application refers to one or more software modules, software routines or software programs and combinations thereof. A suite includes one or more software applications, software modules, software routines or software programs and combinations thereof. The techniques described herein may be implemented as software in the form of one or more applications and suites and may include lower level drivers, object code, and other lower level software.

The software may be stored on and executed from any local or remote machine readable medium such as, for example, without limitation, magnetic media (e.g., hard disks, tape, floppy disks), optical media (e.g., CD, DVD), flash memory products (e.g., memory stick, compact flash and others), and volatile and non-volatile silicon memory products (e.g., random access memory (RAM), programmable read-only memory (PROM), electronically erasable programmable read-only memory (EEPROM), and others). A storage device is any device that allows for the reading from and/or writing to a machine readable medium.

Description of the Methods

Figure 2:
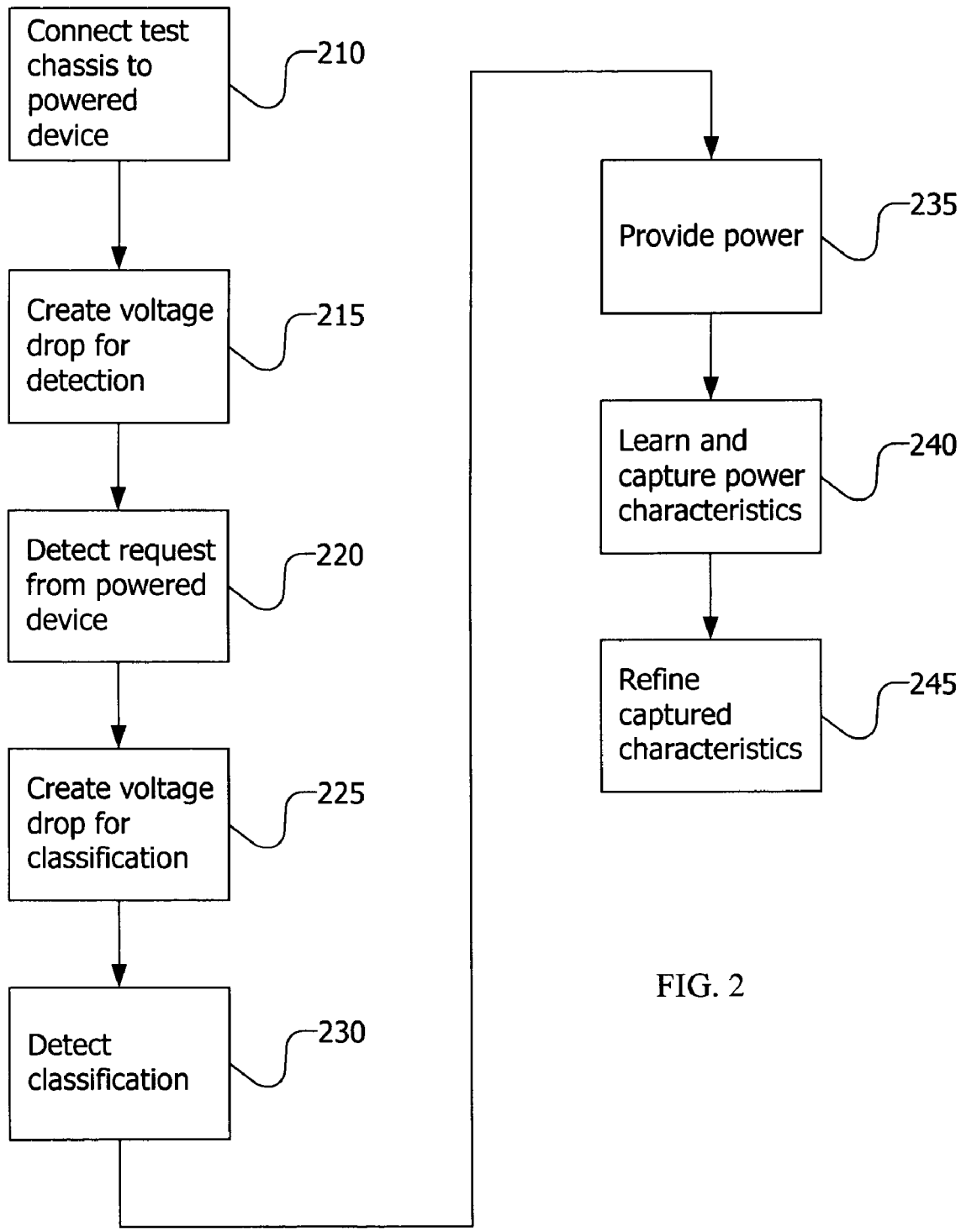
FIG. 2 is a flow chart of a method of testing a device's power characteristics

Referring now to FIG. 2, there is shown a flow chart of a method of testing a device's power characteristics. In this example, one of the line cards 114 (FIG. 1) having a power supply circuit may be used, and the following description is made in this respect. The line card 114 of the test chassis 110 is connected to the network-powered device (step 210) such as the wireless access point 130 or the IP telephone 140. This connection may use a network communications cable, and be through the respective network interfaces of the line card 114 and the network-powered device.

Next, an initial voltage drop is created (step 215). The initial voltage drop may be relatively small −2.8 V to 10 V or slightly beyond. The initial voltage drop may be sufficient for circuitry in the network-powered device to signal its presence and other information. Thus, a power request from the network-powered device may be detected (step 220). The power request may be indicated simply by the presence of a power draw or a load within a predetermined range, which may include a resistance and/or a capacitance.

The initial voltage drop may be applied to all of the lines in the communications cable, may be applied only to selected lines, and may be applied in a sequence. For example, the communications cable may be able to provide power over several different pairs of wires, and the network-powered device may present a load on only one pair or on a limited number of pairs. The detection step 220 may end upon detection on a first pair of lines which the network-powered device loads, or may check more than one pair for the network-powered device's ability to load. This detection of which lines the network-powered device can use for power may be considered identification of a mode of the network-powered device. In other words, the mode corresponds to providing power through an identified one of the pairs of wires in the communications cable.

Once the presence of the network-powered device is detected (step 220), a voltage drop may be created for classifying the network-powered device (step 225), and the network-powered device classified (step 230). In classification, a voltage drop may be provided which is sufficient to power a circuit in the network-powered device, a classification from the network-powered device may be sensed. The classification may be a signal, a message, or a power signature. Classification may identify the characteristics of the power that the network-powered device wishes to draw. The class may correspond to a minimum and maximum current draw selected from a group of ranges.

Thus, a power source may be provided to the network-powered device according to the power request (step 235). Thus, power is provided to the network-powered device for its normal operations. In these normal operations, data may be transmitted to and received from the network-powered device.

As power is provided to the network-powered device, the network-powered device's power characteristics may be learned and captured (step 240). These characteristics may include the network-powered device's power draw characteristics. The network-powered device's power draw characteristics may be captured with reference to time, mode, voltage, current, data activity or a combination of these. The power characteristics may include one or more of resistance, capacitance, power load, current draw, open line and short circuit. The method of power delivery may be intentionally varied to better characterize the network-powered device.

In addition to the network-powered device's power characteristics, data-related events may be monitored and captured with respect to time. With this information, the network-powered device's power characteristics with respect to time may be correlated, and a better view of the network-powered device's power characteristics may be obtained. For example, if the network-powered device includes a 10/100 Ethernet interface, a change from 10 BaseT mode to 100 BaseT mode may result in a change in power draw. As another example, the network-powered device may have certain inefficiencies and efficiencies based upon whether it is receiving data or transmitting data, bandwidth, type of data and protocols. The device's mode (e.g., off-hook, speaker phone) may also change its behavior. Also, changes in power to the device may impact its data processing performance or accuracy. Furthermore, the data-related events may be captured and processed as described in the aforementioned patent application entitled, "Automated Characterization Of Network Traffic."

The providing power step 240 may be performed until the network-powered device signals that power is no longer needed or until the line card 114 detects that the network-powered device no longer requires power.

The network-powered device's power characteristics may be refined—as they are captured and/or after capturing (step 245). Furthermore, the power characteristics of a number of similar network-powered devices may be monitored and the variations between them recorded. The power characteristics may be recorded to follow a varying model, such as a Monte Carlo model.

The captured power characteristics may be stored in a form such as a script table, and/or a record in a database or other storage format (data unit). Furthermore, the method of FIG. 2 may be repeated for the same or different network-powered devices so that a library of scripts of network-powered devices power characteristics may be developed. The scripts and the library may be stored in the line card 114, in the test chassis 110, in the console 160 or elsewhere.

Figure 3:
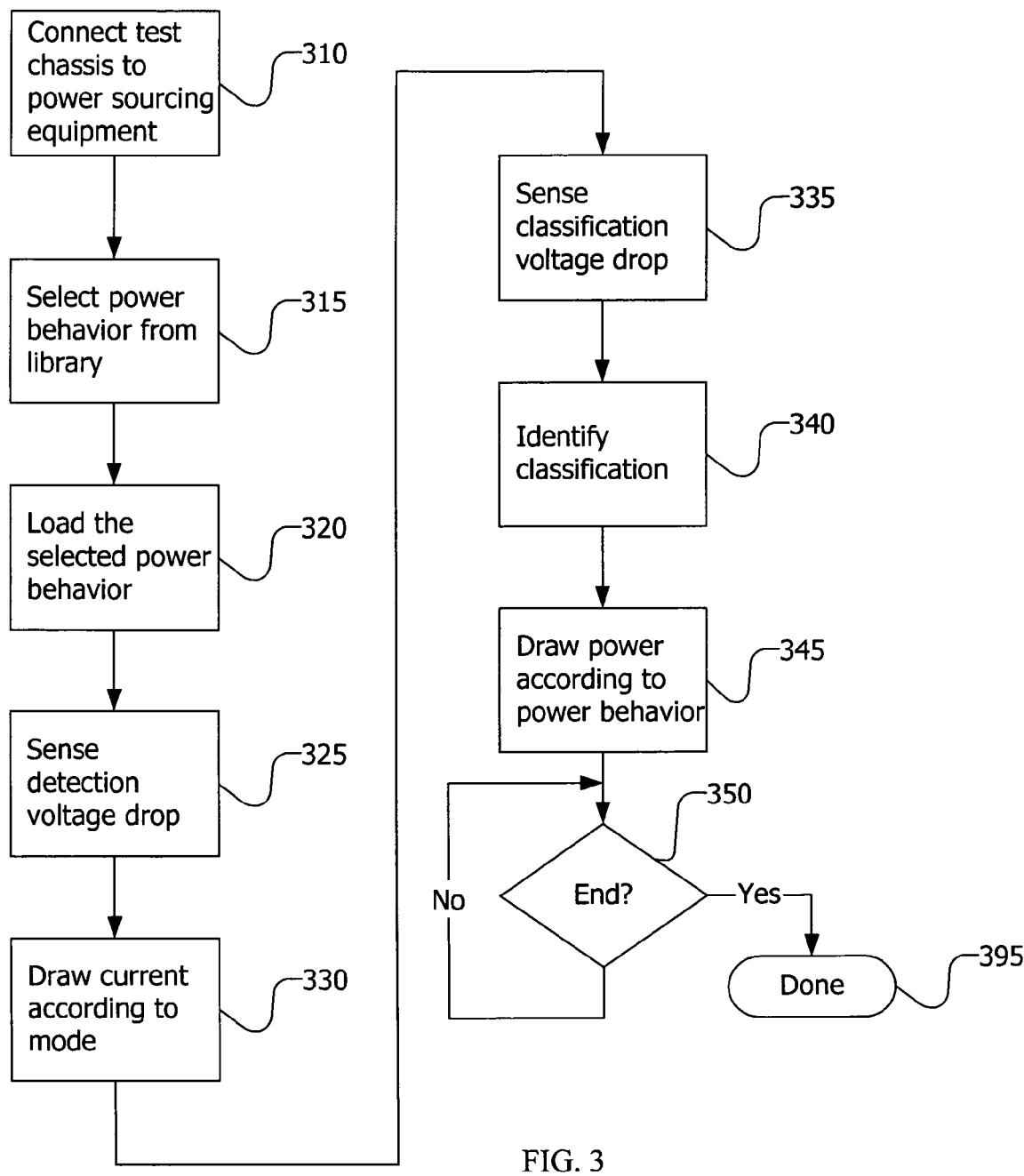
FIG. 3 is a flow chart of a method of emulating a device's power characteristics.

Referring now to FIG. 3, there is shown a flow chart of a method of emulating a network-powered device's power characteristics. In this example, one of the line cards 114 (FIG. 1) having a power consumption circuit may be used, and the following description is made in this respect. The line card 114 of the test chassis 110 is connected to power sourcing equipment, such as the powered mid-span hub 130 (FIG. 1) (step 310). This connection may use a network communications cable, and be through the respective network interfaces of the line card 114 and the power sourcing equipment.

At the outset, a power behavior may be selected from a library of power behaviors of network-powered devices or other devices (step 315). The power behavior comprises power draw characteristics. The power draw characteristics may include one or more of resistance, capacitance, power load, current draw, open line and short circuit or linear or non-linear combination. The power draw characteristics may include power device mode or mode sequences with or without dependencies on time or other factors. The library may contain the scripts produced according to the methods described above, and the selected power behavior may be in the form of a script.

The power behavior may be manually modified or edited, and adjusted with variations. Variations may be individual and/or dependent on factors such as time. Furthermore, the power behavior may be modified during operation. The power behavior may in some respects follow a Monte Carlo model.

The selected script may then be loaded, as well as other scripts (step 320). In addition to or in lieu of the script, instructions and/or parameters for power behavior may be provided. For example, a user at the console 160 may specify additional performance criteria. Furthermore, several situations may be simulated to test the power sourcing equipment's response. These situations may be included in the script or may be added later. These situations may include a short circuit, resistance set to simulate an open circuit, non-linear behavior, negative resistance behavior or others.

The line card 114 may sense a voltage drop (step 325). The voltage drop may be predefined, and may be identified in the script. The script may include a mode. The mode may correspond to receiving power through an identified one of plural pairs of wires in the communications cable. Thus, according to the script, the line card 114 may present a load on one or more selected pairs of wires in the communications cable. The line card 114 may then draw current or present equivalent resistance (step 330), and the current draw may be in a range identified in the script.

The script may identify a class. The line card 114, further according to the script, may identify a voltage drop on the selected pair of wires for providing the line card's classification (step 335). The class may correspond to a minimum and maximum current draw or equivalent resistance selected from a group of ranges. The line card 114 may then provide the class from the script (step 340).

The line card may then draw power based upon the script (step 345), and continue to do so until the script instructs or the power is otherwise terminated to the line card 114 through the communications cable (steps 350, 395). For example, the script may specify a length of time for drawing power, or a total amount of power to draw.

In addition to drawing power, the line card may transmit data and receive data on the communications cable. The data traffic may be as set forth in the script. Furthermore, the data traffic may be generated as described in the aforementioned patent application entitled, "Automated Characterization Of Network Traffic."

With regard to FIGS. 2 and 3, additional and fewer steps may be taken, and the steps as shown may be combined or further refined to achieve the methods described herein.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention. For example, the systems described herein may be used to collect, analyze, model, profile, sort and portray power characteristics as described with respect to data traffic in the aforementioned patent application entitled, "Automated Characterization Of Network Traffic."

The invention claimed is:

1. An apparatus for testing a device's power comprising:
   a processor;
   a memory;
   a network interface for interfacing to a communications medium;
   a power supply coupled to the network interface for providing power to the communications medium under control of the processor;
   wherein the processor and the memory comprise circuits and software for
      detecting a power request from the device,
      causing the power supply to provide power to the network interface for the communications medium;
   learning and capturing the device's power characteristics;
   wherein the power request identifies a class,
   wherein the class corresponds to a minimum and maximum current draw selected from a group of ranges.

2. An apparatus for testing a device's power characteristics comprising:
   a processor;
   a memory;
   a network interface for interfacing to a communications medium;
   a power supply coupled to the network interface for providing power to the communications medium under control of the processor;

wherein the processor and the memory comprise circuits and software for
  detecting a power request from the device,
  causing the power supply to provide power to the network interface for the communications medium,
  learning and capturing the device's power characteristics;
wherein the power request identifies a mode;
wherein the network interface is for interfacing to a communications medium comprising a communications cable comprising plural pairs of wires, and the mode corresponds to providing power through an identified one of the pairs of wires.

3. An apparatus for testing a device's power characteristics comprising:
  a processor;
  a memory;
  a network interface for interfacing to a communications medium;
  a power supply coupled to the network interface for providing power to the communications medium under control of the processor;
  wherein the processor and the memory comprise circuits and software for
    detecting a power request from the device,
    causing the power supply to provide power to the network interface for the communications medium;
  learning and capturing the device's power characteristics;
  wherein the circuits and software are further for causing the power supply to create a voltage drop and detecting an expected power draw from the device.

4. An apparatus for testing a device's power characteristics comprising:
  a processor;
  a memory;
  a network interface for interfacing to a communications medium;
  a power supply coupled to the network interface for providing power to the communications medium under control of the processor;
  wherein the processor and the memory comprise circuits and software for
    detecting a power request from the device,
    causing the power supply to provide power to the network interface for the communications medium,
    learning and capturing the device's power characteristics;
  wherein the circuits and software are further for classifying the power device;
  wherein the circuits and software are further for classifying comprise circuits and software for creating at least one voltage drop sufficient to power a circuit in the device and sensing classification characteristics from the device.

5. An apparatus for testing a device's power characteristics comprising:
  a processor;
  a memory;
  a network interface for interfacing to a communications medium;
  a power supply coupled to the network interface for providing power to the communications medium under control of the processor;
  wherein the processor and the memory comprise circuits and software for
    detecting a power request from the device,
    causing the power supply to provide power to the network interface for the communications medium;
  learning and capturing the device's power characteristics;
  wherein the circuits and software are further for causing the power supply to provide power to the device according to the power request;
  wherein the circuits and software are further for learning and capturing the device's power draw characteristics;
  wherein the circuits and software are further for capturing the device's power draw characteristics with reference to time.

6. The apparatus for testing a device's power characteristics of claim 5, wherein the power characteristics include at least one of resistance, capacitance, power load, current draw, open line and short circuit.

7. The apparatus for testing a device's power characteristics of claim 5, wherein the circuits and software are further for causing the power supply to provide power until the device signals that power is no longer needed or until power is no longer required.

8. An apparatus for testing a device's power characteristics comprising:
  a processor;
  a memory;
  a network interface for interfacing to a communications medium;
  a power supply coupled to the network interface for providing power to the communications medium under control of the processor;
  wherein the processor and the memory comprise circuits and software for
    detecting a power request from the device,
    causing the power supply to provide power to the network interface for the communications medium;
    learning and capturing the device's power characteristics;
  wherein the circuits and software are further for
    storing the device's power characteristics as a first data unit,
    detecting another power request from another device,
    learning and capturing the other device's power characteristics,
    storing the other device's power characteristics as a second data unit.

9. An apparatus for testing a device's power characteristics comprising:
  a processor;
  a memory;
  a network interface for interfacing to a communications medium;
  a power supply coupled to the network interface for providing power to the communications medium under control of the processor;
  wherein the processor and the memory comprise circuits and software for
    detecting a power request from the device,
    causing the power supply to provide power to the network interface for the communications medium;
  learning and capturing the device's power characteristics;
  wherein the circuits and software are further for transmitting data to the device and receiving data from the device;
  wherein the circuits and software are further for monitoring and capturing data-related events with respect to time.

10. The apparatus for testing a device's power characteristics of claim 9, wherein the circuits and software are further for correlating the captured data-related events to the device's power characteristics over time.

11. An apparatus for emulating a device's power characteristics comprising:
- a processor;
- a memory;
- a network interface for interfacing to a communications medium;
- a power consumption unit coupled to the network interface for drawing power from the communications medium under control of the processor;
- wherein the processor and the memory comprise circuits and software for
  - selecting a power behavior from a library of power behaviors of devices,
  - loading the selected power behavior,
  - requesting power in accordance with the selected power behavior,
  - drawing power based upon the selected power behavior;
- wherein the power behavior identifies a class;
- wherein the class corresponds to a minimum and maximum current draw selected from a group of ranges.

12. An apparatus for emulating a device's power characteristics comprising:
- a processor;
- a memory;
- a network interface for interfacing to a communications medium;
- a power consumption unit coupled to the network interface for drawing power from the communications medium under control of the processor;
- wherein the processor and the memory comprise circuits and software for
  - selecting a power behavior from a library of power behaviors of devices,
  - loading the selected power behavior,
  - requesting power in accordance with the selected power behavior,
  - drawing power based upon the selected power behavior;
- wherein the power behavior includes a mode;
- wherein the network interface is for interfacing to a communications medium comprising a communications cable comprising plural pairs of wires, and the mode corresponds to receiving power through an identified one of plural pairs of the wires.

13. The apparatus for emulating a device's power characteristics of claim 12, wherein the circuits and software are further for sensing a voltage drop in a first range on the identified pair of wires and drawing current in a second range.

14. An apparatus for emulating a device's power characteristics comprising:
- a processor;
- a memory;
- a network interface for interfacing to a communications medium;
- a power consumption unit coupled to the network interface for drawing power from the communications medium under control of the processor;
- wherein the processor and the memory comprise circuits and software for
  - selecting a power behavior from a library of power behaviors of devices,
  - loading the selected power behavior,
  - requesting power in accordance with the selected power behavior,
  - drawing power based upon the selected power behavior;
- wherein the power behavior specifies a length of time for drawing power.

* * * * *